Patented Apr. 20, 1948

2,439,821

UNITED STATES PATENT OFFICE 2,439,821

LUBRICANT PREPARATION

John M. Musselman, South Euclid, Ohio, assignor to The Standard Oil Company, Cleveland, Ohio, a corporation of Ohio No Drawing. Application August 19, 1942, Serial No. 455,344

24 Claims. (Cl. 252—32.7)

Degras has been known for some time as an addition to mineral oils for lubrication purposes, but such combination has no value in internal combustion engines. I have now found however that by reacting upon degras or other wax as set forth more in detail hereinafter, products may be had which are of particular utility in several respects for lubricating usages even under very drastic high temperature conditions.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

The invention will be readily understood by reference to an illustrative instance of its practice:

Degras is treated with about 20 per cent by weight of phosphorus pentasulphide at a temperature between 275 and 350° F., such that a sulphurizing reaction takes place without phosphorization. An exothermic reaction occurs and generally a reaction time of an hour or slightly more or less is involved. If molecular proportions be employed, useless dilution with unreacted ingredient material may be avoided, although such is not harmful. A slight excess of the theoretical amount of phosphorus pentasulphide has some advantage in establishing reaction driving conditions and forcing the reaction of the degras to completion. After the reaction, the sludge of phosphorus oxide and other material is separated, as by centrifuging or filtering. The filtered reaction product contains around 20 per cent sulphur and substantially no phosphorus except that which may not be completely removed by filtration and which in general is not over a fraction of a per cent. This reaction product is next reacted with barium oxide or barium hydrate to form the barium compound. The amount of barium oxide or hydrate will depend upon the particular end product desired, and may range from small quantities to large amounts. In general, 5 to 15 per cent of barium oxide or 10 to 30 per cent of barium hydrate is desirable. Heating with the barium oxide or hydrate at around 210° F. for about two hours serves for the formation of the metal compound. Instead of using barium oxide or barium hydrate, the initial reaction product may be neutralized with caustic soda or potash and such salt may be then reacted with a barium salt, e. g. barium chloride, in double decomposition to form the desired barium compound. This compound is an excellent lubricant per se for gear usages etc., and it may also be made up with lubricating oils in amounts as desired. Generally, 1 to 10 per cent of the barium compound in lubricating oil is suitable.

The barium compound has the properties of stabilizing mineral oil against break down, and exercising a peptizing action or detergency tending to maintain solids in dispersion and maintaining a clean metal surface. It further raises the viscosity index and also lowers the cold test.

Likewise, other waxes, such as lanolin, carnauba, Japan wax, sperm oil, etc. may be employed as raw material. The normally non-liquid waxes are particularly advantageous. Other reactive phosphorus sulphides may be employed, as sesquisulphide, etc., and amounts of sulphide may be ten to fifty per cent in general. And, other metals applicable are calcium, magnesium, aluminum, tin, zinc, potassium, sodium, strontium, thallium, etc., i. e. any reactive metal, and in particular these may be applied as co-reactants of barium with the wax-phosphorus sulphide reaction product; that is, a dual salt has outstanding advantages. The metal may be introduced by reacting its oxide or hydrate, or where desired by first making a sodium and potassium compound of the reaction product, as by treating with the hydroxide, and then by double decomposition reacting this with a soluble salt, e. g. chloride, sulphate, etc., of the metal desired in the final product. In some cases, the saponifying or making of a metal compound of the reaction product may be carried out incompletely, such as to partially saponify, and leave more or less unsaponified reaction product in the mixture. In some cases instead of co-reacting, the separately-formed barium compound of the reaction product may be mixed with the calcium or other compound in desired proportions, and such mixture may be employed as a lubricant or may be incorporated in a mineral oil.

As another example: Degras is reacted with phosphorus pentasulphide as above, and then about 3.5 per cent of calcium hydrate and about 14 per cent of barium hydrate are reacted with the product to formation of the barium and calcium compound.

An S. A. E. 20 lubricating oil containing 5 per cent of the barium salt of phosphorus sulphide reacted degras as above, tested in a test engine of Ethyl Gasoline Corporation type operating with a compression ratio 7:1, speed 1200 R. P. M., jacket temperature 212° F., and sump temperature 300° F., showed the following results: after 20 hours, no sludge, acid number 0.56, viscosity increase 35, and no deposit on the piston skirt; and after 60 hours, 0.05 per cent sludge, acid number 1.58, viscosity increase 45, and no deposit on piston skirt. In contrast, the S. A. E. 20 oil without the addition agent and in similar conditions showed at the end of 20 hours, 4.0 per cent sludge, acid number 2.10, viscosity increase 413, and piston skirt rating 7.0 (on a scale of 10, zero being a clean new piston, and 10 being the maximum accumulation under practical operating conditions). The S. A. E. 20 oil with a 5 per cent addition of the acid phosphorus sulphide reacted degras per se when tested under similar conditions, at the end of 60 hours running showed 0.8 per cent sludge, acid number 2.5, viscosity increase 49, and piston skirt rating 5.0.

The particularly excellent peptizing action or detergency of the barium compound is shown by the test method measuring the ability of lubricants to maintain carbon black in suspension. A 1 per cent carbon black suspension in S. A. E. 20 Mid-Continent oil, by such test, was entirely settled out after 20 hours standing. A similar 1 per cent carbon black suspension in S. A. E. 20 Mid-Continent oil to which 5 per cent of the initial acid phosphorus pentasulphide and degras reaction product was added, also was completely settled out after 20 hours standing. Similar S. A. E. 20 Mid-Continent oil to which 5 per cent of the barium compound was added, maintained the carbon black in suspension 250 hours. The compounds of the present invention are particularly valuable for making mineral oils suitable for Diesel type engine operation where products of combusion produce materials tending to block up small openings.

An S. A. E. 20 Mid-Continent lubricating oil showing an A. S. T. M. cold test of plus 20° F, on addition of 5 per cent of the initial acid phosphorus sulphide and degras reaction product showed a cold test of 0° F, while the S. A. E. 20 Mid-Continent oil to which 5 per cent of the barium reaction product was added, showed a cold test of minus 15° F.

This application is a continuation, in part and as to common subject matter of my application Serial No. 376,675, filed Jan. 30, 1941, which issued as Patent No. 2,331,923 on October 19, 1943.

Other modes of applying the principle of the invention may be employed, change being made as regards the details described, provided the features stated in any of the following claims, or the equivalent of such, be employed.

I therefore particularly point out and distinctly claim as my invention:

1. As a composition of matter suitable for use as a lubricant and as an addition agent to improve the characteristics of lubricating oils, a barium-containing compound of the reaction product of a phosphorus sulfide and an ester wax reacted at a temperature at which most of the phosphorus of the phosphorus sulfide seperates from said reaction product.

2. As a composition of matter suitable for use as a lubricant and as an addition agent to improve the characteristics of lubricating oils, a dual-reactive metal compound of the reaction product of a phosphorus sulfide and an ester wax reacted at a temperature at which most of the phosphorus of the phosphorus sulfide separates from said reaction product.

3. As a composition of matter suitable for use as a lubricant and as an addition agent to improve the characteristics of lubricating oils, a barium compound of the reaction product of a phosphorus sulfide and an ester wax reacted at a temperature at which most of the phosphorus of the phosphorus sulfide separates from said reaction product.

4. As a composition of matter suitable for use as a lubricant and as an addition agent to improve the characteristics of lubricating oils, a barium-containing compound of the reaction product of a phosphorus sulfide and an ester wax reacted at a temperature at which most of the phosphorus of the phosphorus sulfide separates from said reaction product.

5. As a composition of matter suitable for use as a lubricant and as an addition agent to improve the characteristics of lubricating oils, a barium and calcium dual-metal compound of the reaction product of a phosphorus sulfide and an ester wax reacted at a temperature at which most of the phosphorus of the phosphorus sulfide separates from said reaction product.

6. As a composition of matter suitable for use as a lubricant and as an addition agent to improve the characteristics of lubricating oils, a barium and aluminum dual-metal compound of the reaction product of a phosphorus sulfide and an ester wax reacted at a temperature at which most of the phosphorus of the phosphorus sulfide separates from said reaction product.

7. As a composition of matter suitable for use as a lubricant and as an addition agent to improve the characteristics of lubricating oils, a barium-containing dual-metal compound of the reaction product of phosphorus pentasulfide and degras reacted at a temperature at which most of the phosphorus of the phosphorus pentasulfide separates from said reaction product.

8. As a composition of matter suitable for use as a lubricant and as an addition agent to improve the characteristics of lubricating oils, a dual-reactive metal compound of the reaction product of phosphorus pentasulfide and degras reacted at a temperature at which most of the phosphorus of the phosphorus pentasulfide separates from said reaction product.

9. As a composition of matter suitable for use as a lubricant and as an addition agent to improve the characteristics of lubricating oils, a barium-containing compound of the reaction product of phosphorus pentasulfide and degras reacted at a temperature at which most of the phosphorus of the phosphorus pentasulfide separates from said reaction product.

10. As a composition of matter suitable for use as a lubricant and as an addition agent to improve the characteristics of lubricating oils, a barium and calcium dual-metal compound of the reaction product of phosphorus pentasulfide and degras reacted at a temperature at which most of the phosphorus of the phosphorus pentasulfide separates from said reaction product.

11. A mineral oil lubricant comprising a mineral lubricating oil as the primary component, and to stabilize the oil and improve its properties a small amount of a barium-containing dual-metal compound of the reaction product of a phosphorus sulfide and an ester wax reacted at a temperature at which most of the phosphorus of the phosphorus sulfide separates from said reaction product.

12. A mineral oil lubricant comprising a mineral lubricating oil as the primary component and to stabilize the oil and improve its properties a small amount of a dual-reactive-metal compound of the reaction product of a phosphorus sulfide and an ester wax reacted at a temperature at which most of the phosphorus of the phosphorus sulfide separates from said reaction product.

13. A mineral oil lubricant comprising a mineral lubricating oil as the primary component and to stabilize the oil and improve its properties a small amount of a barium compound of the reaction product of a phosphorus sulfide and an ester wax reacted at a temperature at which most of the phosphorus of the phosphorus sulfide separates from said reaction product.

14. A mineral oil lubricant comprising a mineral lubricating oil as the primary component and to stabilize the oil and improve its properties a small amount of a barium-containing compound of the reaction product of a phosphorus sulfide and an ester wax reacted at a temperature at which most of the phosphorus of the phosphorus sulfide separates from said reaction product.

15. A mineral oil lubricant comprising a mineral lubricating oil as the primary component and to stabilize the oil and improve its properties a small amount of a barium and calcium dual-metal compound of the reaction product of a phosphorus sulfide and an ester wax reacted at a temperature at which most of the phosphorus of the phosphorus sulfide separates from said reaction product.

16. A mineral oil lubricant comprising a mineral lubricating oil as the primary component and to stabilize the oil and improve its properties a small amount of a barium and aluminum dual-metal compound of the reaction product of a phosphorus sulfide and an ester wax reacted at a temperature at which most of the phosphorus of the phosphorus sulfide separates from said reaction product.

17. A mineral oil lubricant comprising a mineral lubricating oil as the primary component and to stabilize the oil and improve its properties a small amount of a barium-containing dual-metal compound of the reaction product of phosphorus pentasulfide and degras reacted at a temperature at which most of the phosphorus of the phosphorus pentasulfide separates from said reaction product.

18. A mineral oil lubricant comprising a mineral lubricating oil as the primary component and to stabilize the oil and improve its properties a small amount of a dual-reactive-metal compound of the reaction product of phosphorus pentasulfide and degras reacted at a temperature at which most of the phosphorus of the phosphorus pentasulfide separates from said reaction product.

19. A mineral oil lubricant comprising a mineral lubricating oil as the primary component and to stabilize the oil and improve its properties a small amount of a barium-containing compound of the reaction product of phosphorus pentasulfide and degras reacted at a temperature at which most of the phosphorus of the phosphorus pentasulfide separates from said reaction product.

20. A mineral oil lubricant comprising a mineral lubricating oil as the primary component and to stabilize the oil and improve its properties a small amount of a barium and calcium dual-metal compound of the reaction product of phosphorus pentasulfide and degras reacted at a temperature at which most of the phosphorus of the phosphorus pentasulfide separates from said reaction product.

21. The process of making a composition for use as a lubricant and as an addition agent to improve the characteristics of lubricating oils, comprising reacting a phosphorus sulfide with an ester wax at a temperature of between about 275° to 350° F., removing a sludge from the reaction product, and reacting said product with compounds of a plurality of metals, one of which is barium.

22. The process of making a composition suitable for use as a lubricant and as an addition agent to improve the characteristics of lubricating oils, comprising reacting a phosphorus sulfide with an ester wax at a temperature of between about 275° to 350° F., removing a sludge from the reaction product, and reacting said product with compounds of a plurality of metals.

23. The process of making a composition suitable for use as a lubricant and as an addition agent to improve the characteristics of lubricating oils, comprising reacting a phosphorus sulfide with an ester wax at a temperature of between about 275° to 350° F., removing a sludge from the reaction product, and reacting said product with a compound of barium.

24. The process of making a composition suitable for use as a lubricant and as an addition agent to improve the characteristics of lubricating oils, comprising reacting a phosphorus sulfide with an ester wax at a temperature of between about 275° to 350° F., removing a sludge from the reaction product, and reacting said product with compounds of barium and calcium.

JOHN M. MUSSELMAN.

REFERENCES CITED

The following references are of record in the file of this patent:

UNITED STATES PATENTS

| Number | Name | Date |
|---|---|---|
| 2,289,438 | Knowles | July 14, 1942 |
| 2,257,750 | Lincoln | Oct. 7, 1941 |
| 2,142,998 | Chittick | Jan. 10, 1939 |
| 2,211,306 | Whittier | Aug. 13, 1940 |
| 2,331,923 | Musselman | Oct. 19, 1943 |
| 2,211,231 | Henderson | Aug. 13, 1940 |
| 2,193,771 | Puryear | Mar. 12, 1940 |
| 2,337,868 | Burwell | Dec. 28, 1943 |
| 2,169,793 | Dearborn | Aug. 15, 1939 |

Certificate of Correction

Patent No. 2,439,821.　　　　　　　　　　　　　　　　　　　　　　　　April 20, 1948.

JOHN M. MUSSELMAN

It is hereby certified that errors appear in the printed specification of the above numbered patent requiring correction as follows: Column 3, line 65, claim 1, before the word "compound" insert *dual-metal*; column 6, add the following to the list of references cited—

2,375,061　　Williams et al.___ May 1, 1945 (original filed Dec. 29, 1941)

and that the said Letters Patent should be read with these corrections therein that the same may conform to the record of the case in the Patent Office.

Signed and sealed this 6th day of July, A. D. 1948.

[SEAL]

THOMAS F. MURPHY,
*Assistant Commissioner of Patents.*